(12) United States Patent
Chen (10) Patent No.: US 7,626,819 B1
(45) Date of Patent: Dec. 1, 2009

(54) AIR DIRECTOR

(75) Inventor: Hsin-Hung Chen, Shetou Township, Changhua County (TW)

(73) Assignee: Chenbro Micom Co., Ltd., Chung Ho, Taipei Hsien (TW)

( * ) Notice: Subject to any disclaimer, the term of this patent is extended or adjusted under 35 U.S.C. 154(b) by 0 days.

(21) Appl. No.: 12/318,205

(22) Filed: Dec. 23, 2008

(51) Int. Cl.
*H05K 7/20* (2006.01)

(52) U.S. Cl. .................. 361/695; 361/694; 361/719; 454/184

(58) Field of Classification Search .............. 361/679.5, 361/679.49, 679.48, 694, 695; 454/184
See application file for complete search history.

(56) References Cited

U.S. PATENT DOCUMENTS

| | | | | |
|---|---|---|---|---|
| 6,130,820 A | * | 10/2000 | Konstad et al. ............. | 361/695 |
| 6,292,361 B1 | * | 9/2001 | Johnson et al. ........ | 361/679.54 |
| 6,921,328 B1 | * | 7/2005 | Nohara et al. ................ | 454/184 |
| 7,061,760 B2 | * | 6/2006 | Hornung et al. ............. | 361/695 |
| 7,092,252 B2 | * | 8/2006 | Robertson ................... | 361/690 |
| 7,254,021 B2 | * | 8/2007 | Lee et al. ..................... | 361/695 |
| 7,261,516 B2 | * | 8/2007 | Liang et al. .............. | 415/213.1 |
| 7,403,388 B2 | * | 7/2008 | Chang ........................ | 361/695 |

* cited by examiner

*Primary Examiner*—Gregory D Thompson
(74) *Attorney, Agent, or Firm*—Bacon & Thomas, PLLC (57) ABSTRACT

An air director includes a fan bracket, which has a circular center opening, a fan mounting structure provided at the front side to secure a fan and to have a fan blade of the fan in alignment with the circular center opening, a plurality of clamping arms extended from the rear side for fastening to respective side arms at a motherboard at two sides relative to insertion slots on the motherboard, and protruding blocks and eye lugs disposed above the protruding blocks, and an air duct, which has a bottom open side attached to the motherboard around the insertion slots, front hooks and top hooks respectively hooked on the protruding blocks and the eye lugs of the fan bracket.

7 Claims, 7 Drawing Sheets

AIR DIRECTOR

BACKGROUND OF THE INVENTION

1. Field of the Invention

The present invention relates to air guide means for use in a motherboard for heat dissipation and more particularly, to an air director formed of a fan bracket and an air duct that can be conveniently assembled and installed in a motherboard around insertion slots of the motherboard without any tools to guide air currents from the fan in carrying heat away from memory modules in the insertion slots efficiently.

2. Description of the Related Art

When an electronic apparatus works for a long period, the internal working temperature will rise. If the internal working temperature of an electronic apparatus is excessively high, the electronic apparatus may be unable for function normally. Further, a motherboard of an electronic apparatus may carry a number of electronic devices, such as CPU (Central processing unit), memory modules (DDR SDRAM or the like), north bridge chip, power adapter and etc. that generate heat during operation. Normally, a high-speed electronic device generates a relatively greater amount of waste heat during operation. To avoid overheat, cooling means such as fan, heat sink, cooler module or the like may be used.

Figure 7:
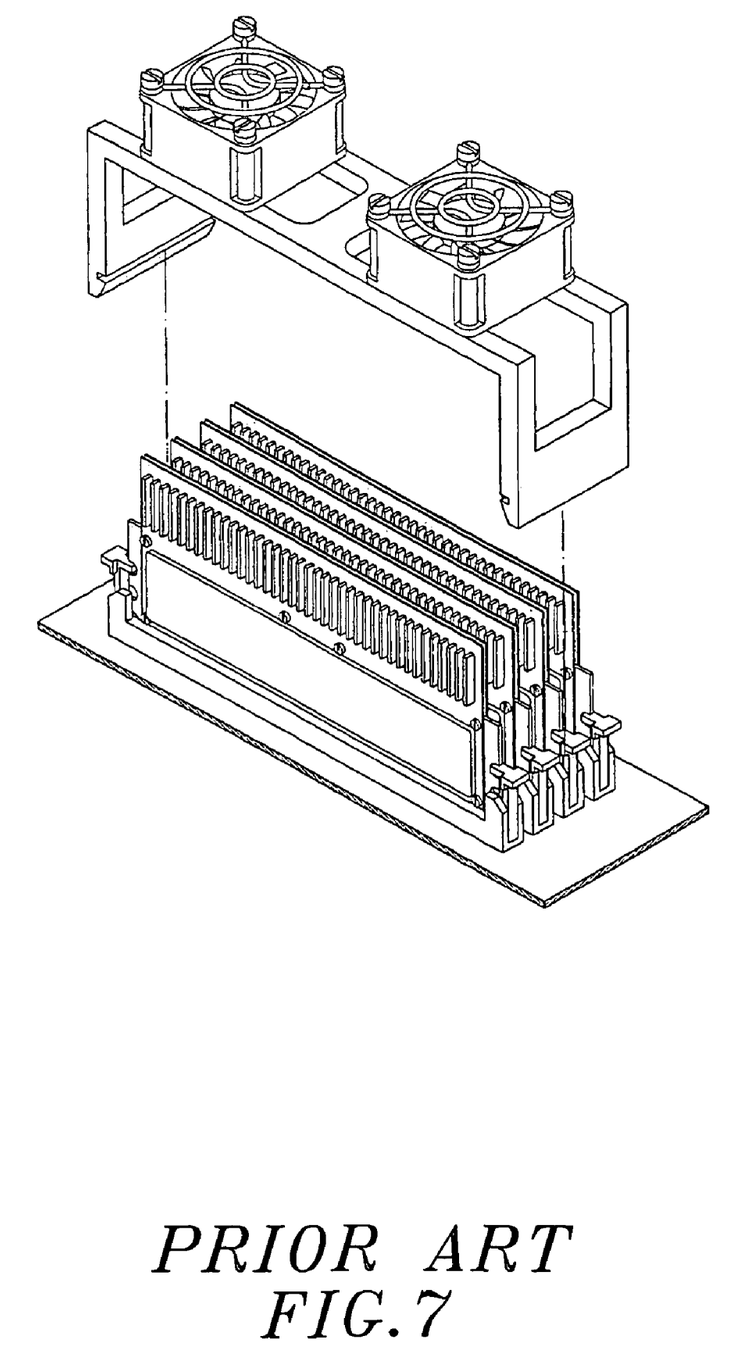
FIG. 7 is an exploded view of a prior art design.

FIG. 7 illustrates a cooler module used in a motherboard for dissipating heat from DDR SDRAMs in insertion slots on a motherboard. As illustrated, the cooler module comprises a heat sink for fastening to the motherboard around the insertion slots, two fan brackets mounted on the heat sink, and two fans respectively installed in the fan brackets. During operation of the DDR SDRAMs, the heat sink absorbs heat from the DDR SDRAMs, and the fans draw hot air away from the area around the heat sink. The use of this design of cooler module to dissipate heat from the DDR SDRAMs has drawbacks as follows:

1. During operation of the DDR SDRAMs, a part of heat energy is dissipated through openings of the heat sink to other areas in the housing that carries the motherboard, lowering the heat dissipation performance.

2. One cooler module is used corresponding to one set of DDR SDRAMs. For dissipating heat from multiple sets of DDR SDRAMs on a motherboard, multiple cooler modules shall be used, increasing the installation cost.

To eliminate the aforesaid problems, an air director may be used with a fan for carrying waste heat from multiple sets of DDR SDRAMs on a motherboard. When an air director is used with a fan in a motherboard, the installation design is important. According to conventional designs, screws are commonly used to affix an air director to a motherboard. This installation procedure is complicated, wasting much time and labor. Further, when an inspection or maintenance work is necessary, the operator needs to unfasten all the screws and then remove the air director from the motherboard. After the inspection or maintenance work is done, the operator needs to install the screws to affix the air director to the motherboard again. During mounting/dismounting of the air director, the screws may get lost.

Therefore, it is desirable provide a measure that eliminates the aforesaid drawbacks and inconvenience.

SUMMARY OF THE INVENTION

The present invention has been accomplished under the circumstances in view. It is one object of the present invention to provide an air director, which can be assembled and installed in a motherboard conveniently without any tools. It is another object of the present invention to provide an air director for motherboard, which guides currents of air accurately through memory modules in insertion slots of the motherboard in which it is installed, thereby carrying heat away from the motherboard efficiently. It is still another object of the present invention to provide an air director for motherboard, which facilitates memory module maintenance work.

To achieve these and other objects of the present invention, an air director comprises a fan bracket and an air duct. The fan bracket comprises a circular center opening, a mounting structure provided at the front side to secure a fan and to keep a fan blade of the fan in alignment with the circular center opening, a plurality of clamping arms extended from the rear side for fastening to respective side arms at a motherboard at two sides relative to insertion slots on the motherboard for memory modules, and protruding blocks and eye lugs disposed above the protruding blocks. The air duct comprises a bottom open side attached to the motherboard around the insertion slots and memory modules in the insertion slots, front hooks and top hooks respectively hooked on the protruding blocks and the eye lugs of the fan bracket, and a rear retaining flange transversely disposed at the rear side for fastening to hook members at the motherboard at a rear side relative to the insertion slots.

When a maintenance work is necessary, the air duct can be turned upwards to disengage the top hooks and the front hooks from the eye lugs and the protruding blocks, thereby exposing the memory modules to the outside for access.

DETAILED DESCRIPTION OF THE PREFERRED EMBODIMENT

Figure 1:
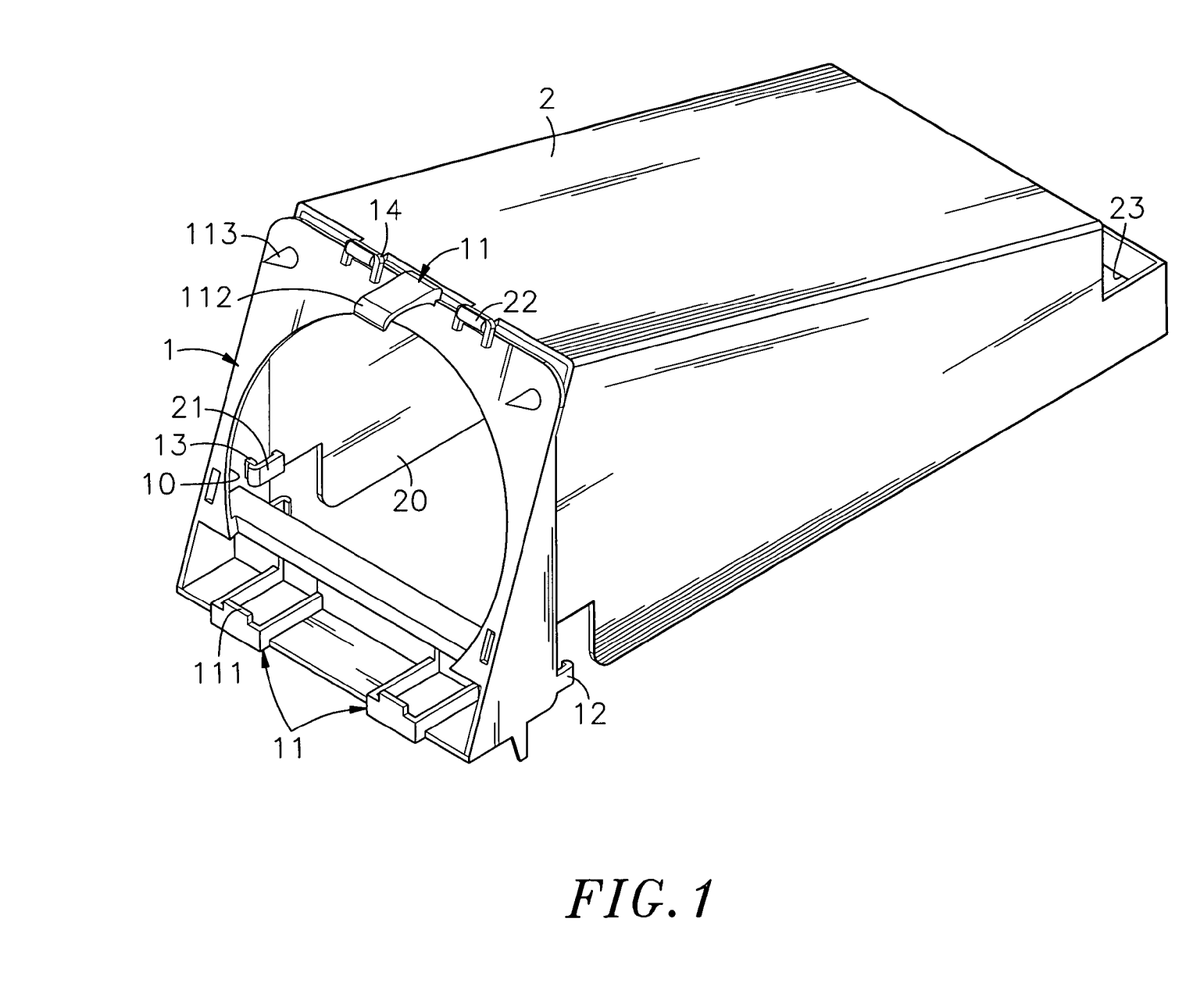
FIG. 1 is an elevational view of an air director in accordance with the present invention.
Figure 2:
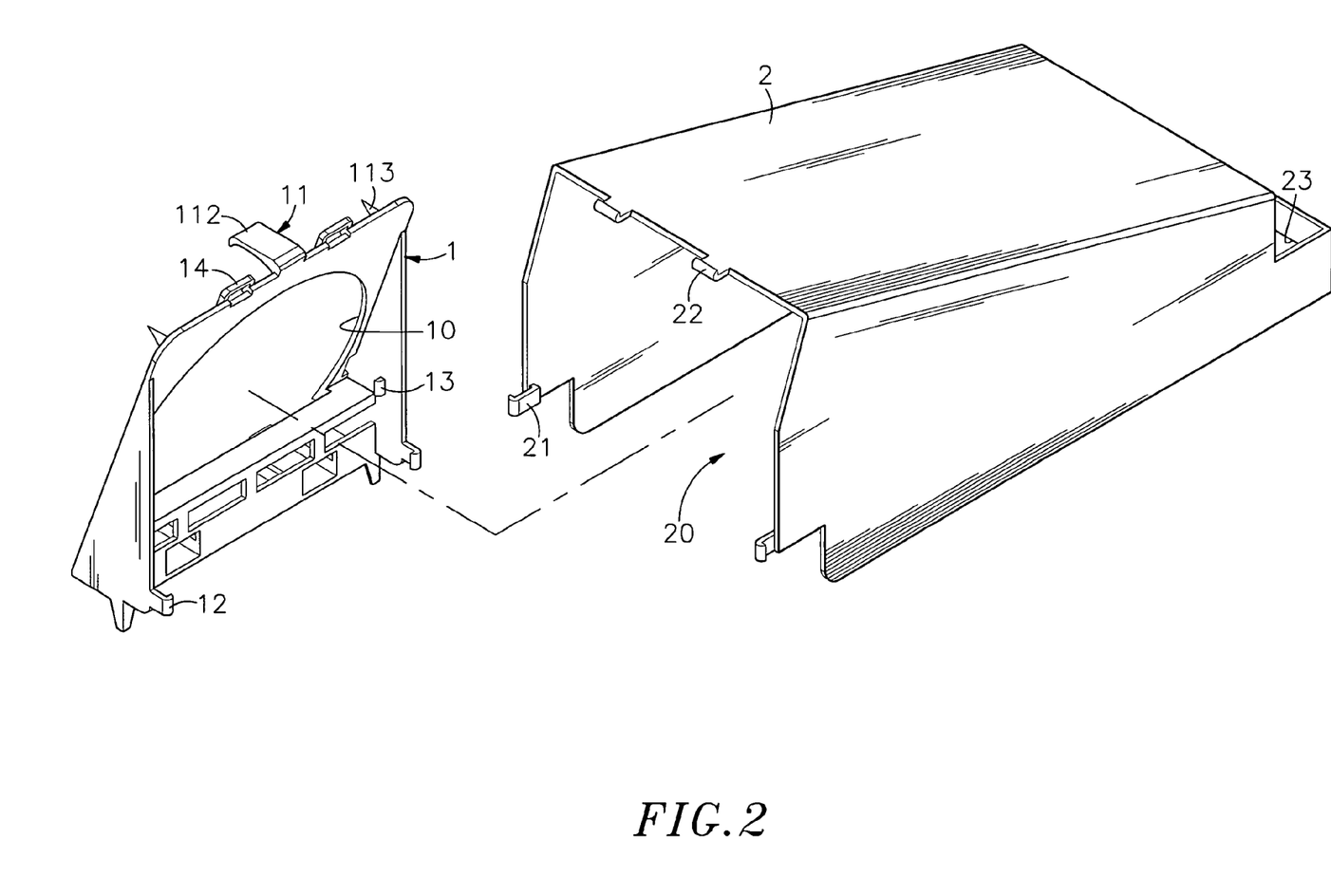
FIG. 2 is an exploded view of the air director in accordance with the present invention.

Referring to FIGS. 1 and 2, an air director in accordance with the present invention comprises a fan bracket 1 and an air duct 2.

The fan bracket 1 comprises a circular center opening 10, a mounting structure 11 provided at one side, namely, the front side around the circular center opening 10 for securing a housing 31 of a fan 3 to keep a fan blade 32 of the fan 3 in alignment with the circular center opening 10, two clamping arms 12 extended from the other side, namely, the rear side for fastening to respective side arms 411 at two sides of multiple insertion slots 41 on a motherboard 4 to secure the fan bracket 1 to the motherboard 4, two protruding blocks 13 bilaterally protruded from the inside wall near the clamping arms 12, and two eye lugs 14 protruded from the top side.

The air duct 2 has a bottom open side 20 attached to the motherboard 4 around the multiple insertion slots 41, two front hooks 21 and two top hooks 22 for hooking on the protruding blocks 13 and the eye lugs 14 of the fan bracket 1 to secure the fan bracket 1 to the front side of the air duct 2, and a rear retaining flange 23 transversely disposed at the rear side for fastening to hook members 412, which secure memory modules 42 (such as DDR, interface card or the like) to the multiple insertion slots 41 of the motherboard 4, to secure the air duct 2 to the motherboard 4.

Figure 3:
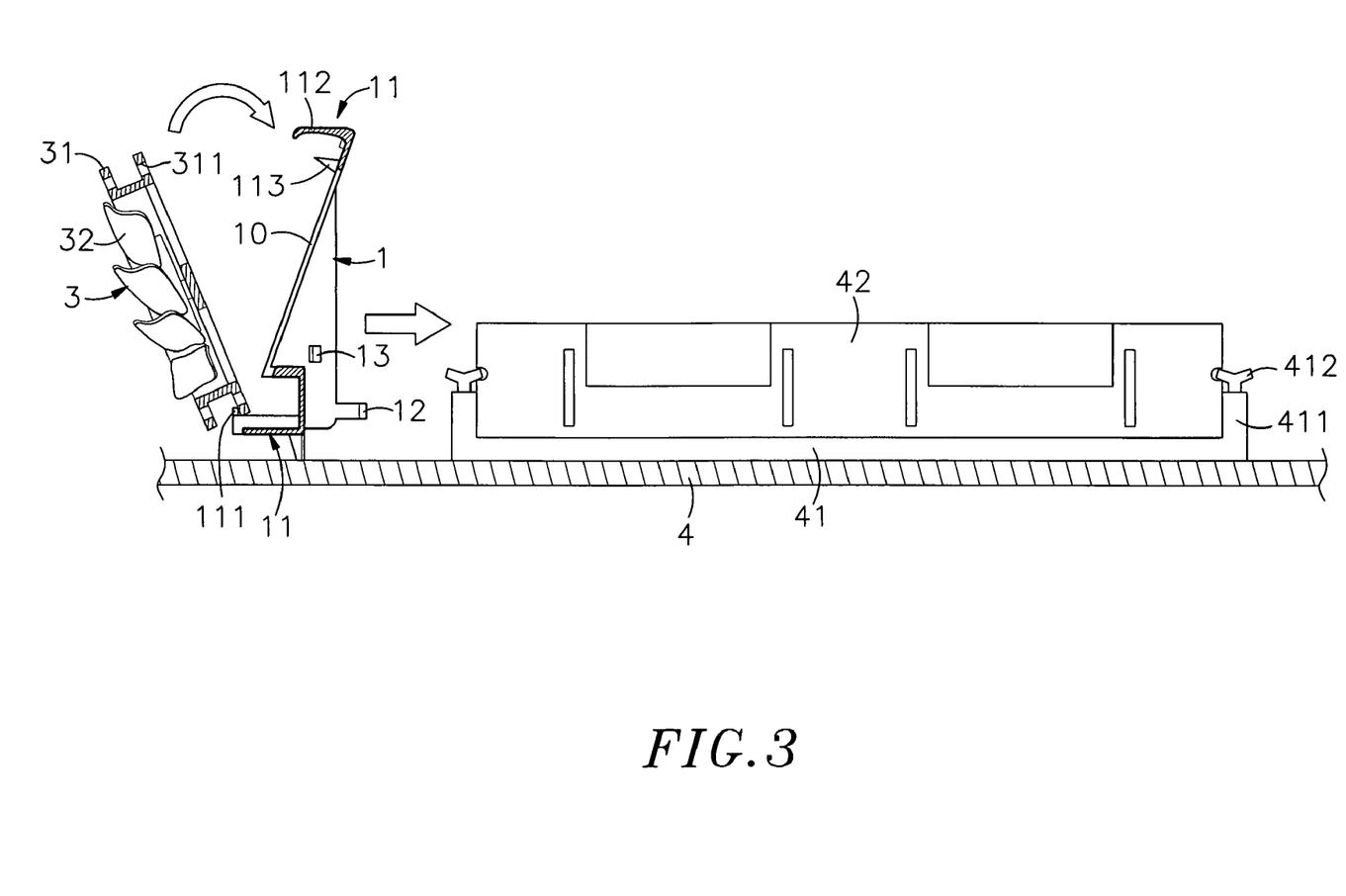
FIG. 3 is a schematic drawing showing installation of the air director in a motherboard.

The mounting structure 11 of the fan bracket 1 comprises two locating blocks 111 disposed at the bottom side of the circular center opening 10 and spaced from each other at a distance for stopping against the front side of a bottom edge of the housing 31 of the fan 3, a springy hook 112 protruded from the front side of the fan bracket 1 above the circular center opening 10 for hooking on a top edge of the housing 31 of the fan 3, and two locating rods 113 equally spaced from the springy hook 112 at two sides for engaging into respective locating holes 311 on the housing 31 of the fan 3 (see FIG. 3).

Figure 4:
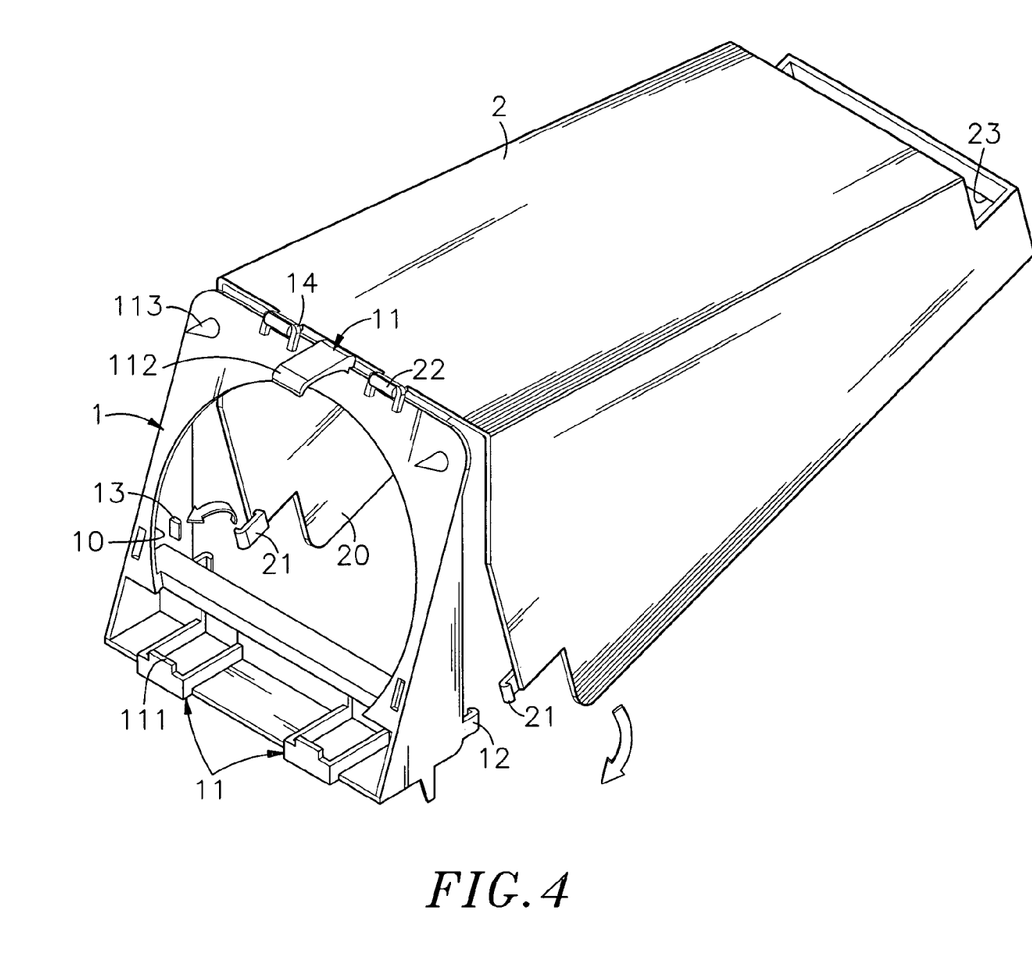
FIG. 4 is an elevational view of the air director in accordance with the present invention.
Figure 5:
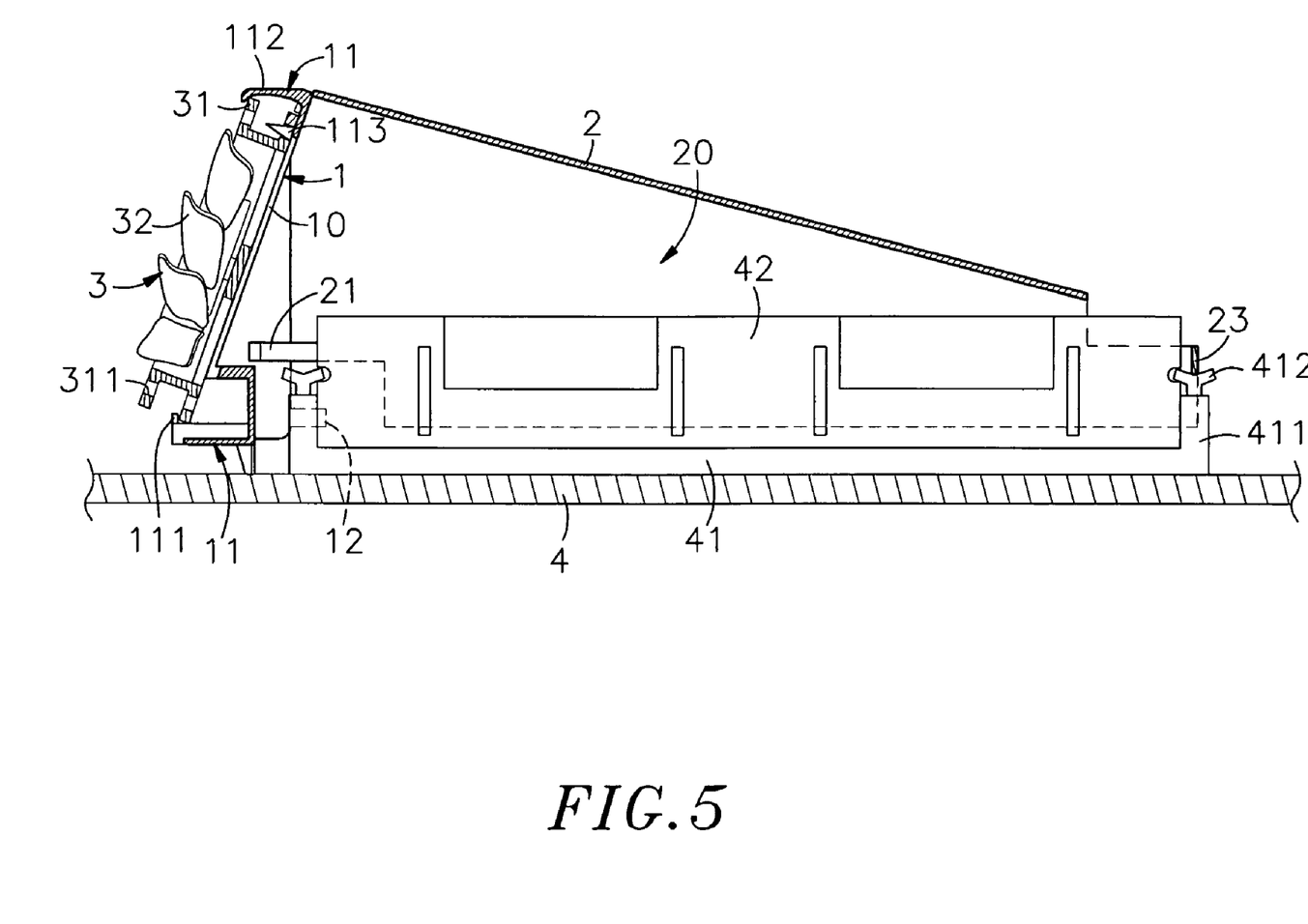
FIG. 5 corresponds to FIG. 3, showing the air director installed in the motherboard.

During the use of the air director, the bottom edge of the housing 31 of the fan 3 is stopped at the back side of the two locating blocks 111 of the mounting structure 11 of the fan bracket 1, and then the fan 3 is turned inwards and closely attached to the front side of the fan bracket 1 to force the locating holes 311 and the top edge of the housing 31 of the fan 3 into engagement with the locating rods 113 and the springy hook 112 of the fan bracket 1 respectively (see FIGS. 3 and 4). After installation of the fan 3 in the fan bracket 1, the fan blade 32 of the fan 3 is kept in alignment with the circular center opening 10 of the fan bracket 1. Thereafter, the fan bracket 1 is attached to the motherboard 4 to force the clamping arms 12 into engagement with the side arms 411 at two sides of multiple insertion slots 41 of the motherboard 4 (see FIG. 5). Thus, the fan 3 is supported on the air director at a front side relative to the insertion slots 41 of the motherboard 4.

Thereafter, the top hooks 22 of the air duct 2 are respectively hooked on the eye lugs 14 of the fan bracket 1 (see FIG. 4), and then the air duct 2 is turned downwards and closely attached to the motherboard 4 to have the multiple insertion slots 41 of the mother board 4 be received in the bottom open side 20 of the air duct 2 and to simultaneously force the front hooks 21 of the air duct 2 into engagement with the protruding blocks 13 of the fan bracket 1, and at the same time the rear retaining flange 23 of the air duct 2 is forced into engagement with the hook members 412 at the rear side of the multiple insertion slots 41 of the motherboard 4 (see FIG. 5), and therefore the fan bracket 1 and the air duct 2 are firmly fastened to the motherboard 4. Further, after engagement between the rear retaining flange 23 of the air duct 2 and the hook members 412, the rear retaining flange 23 imparts a pressure to the hook members 412, enhancing the positioning stability of the memory modules 42 in the multiple insertion slots 41 of the motherboard 4. After installation of the air director, the fan bracket 1 and the air duct 2 surround the multiple insertion slots 41 and the memory modules 42 in the multiple insertion slots 41, and the fan 3 is aimed at the memory modules 42 in the multiple insertion slots 41. During the operation of the memory modules 42 in the multiple insertion slots 41, the fan blade 32 of the fan 3 is rotated to cause currents of air toward the circular center opening 10 of the fan bracket 1 and the inside space of the air duct 2, thereby carrying heat energy away from the memory modules 42.

Figure 6:
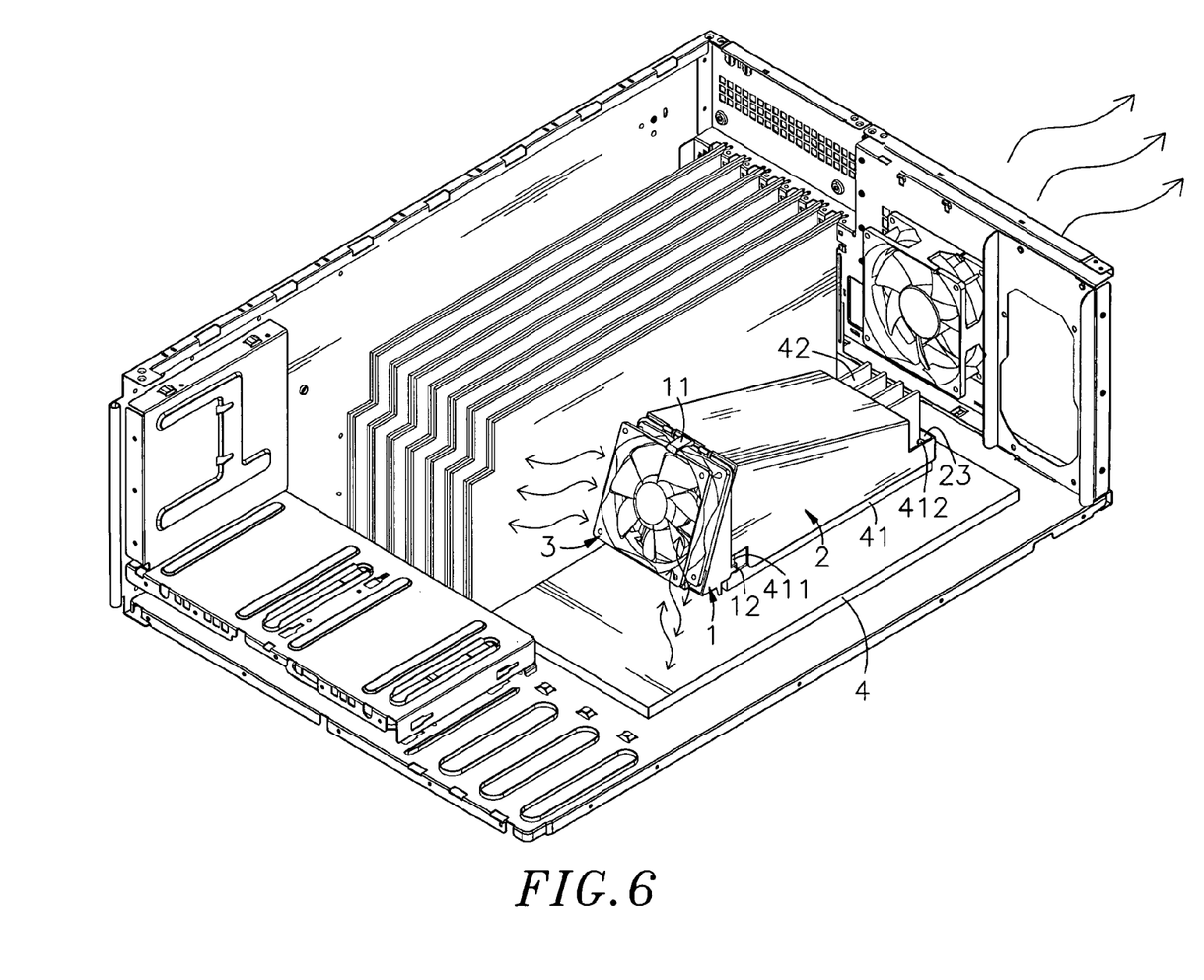
FIG. 6 is a schematic drawing showing an application example of the present invention.

Further, the fan 3 can be an induced-draft fan arranged to draw hot air out of the space in the air duct 2 around the memory modules 42 in the multiple insertion slots 41 of the motherboard 4, as shown in FIG. 6.

As stated above, the air direction of the present invention comprises a fan bracket 1, which has clamping arms 12 fastened to side arms 411 at two sides of multiple insertion slots 41 of a motherboard 4 and holds a fan 3 in alignment with a circular center opening 10 thereof, and an air duct 2, which is fastened to the fan bracket 1 to surround memory modules 42 in the multiple insertion slots 41 of the motherboard 4. During the operation of the memory modules 42, the fan 3 is turned on to blow air toward the memory modules 42 (or to draw hot air away from the inside space of the air duct 2 around the memory modules 42), thereby lowering the temperature of the memory modules 42.

In conclusion, the invention provides an air director that has the following features and advantages:

1. The fan bracket 1 and the air duct 2 of the air director have a simple structure and can be fastened together to hold a fan 3 and installed in a motherboard 4 around multiple insertion slots 41 on the motherboard 4 conveniently. When the fan 3 is started to cause currents of air, the air duct 2 guides the currents of air through the memory modules 42 in the multiple insertion slots 41, thereby carrying heat away from the memory modules 42 efficiently.

2. By means of forcing the clamping arms 12 of the fan bracket 1 into engagement with the side arms 411 at two sides of the multiple insertion slots 41 of the motherboard 4 and then hooking the top hooks 22 of the air duct 2 on the eye lugs 14 of the fan bracket 1 and then turning the air duct 2 downwards to force the front hooks 21 and the rear retaining flange 23 of the air duct 2 into engagement with the protruding blocks 13 of the fan bracket 1 and the hook members 412 of the motherboard 4 respectively, the installation of the air director is done.

3. During a maintenance work of the memory modules 42, turn the air duct 2 upwards to disengage the top hooks 22 and the front hooks 21 of the air duct 2 from the eye lugs 14 and the protruding blocks 13 of the fan bracket 1, thereby exposing the memory modules 42 to the outside for access. Therefore, the air director can be opened easily without any tools to facilitate replacement and repair works of the memory modules 42.

A prototype of air director has been constructed with the features of FIGS. 1~6. The air director functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An air director installed in a motherboard around insertion slots on said motherboard to support a fan having a housing and a fan blade in said housing for causing currents of air to carry heat away from memory modules in said insertion slots, the air director comprising:

a fan bracket, said fan bracket comprising a circular center opening, a fan mounting structure provided at a front side thereof around said circular center opening for securing said housing of said fan to hold said fan blade in alignment with said circular center opening, a plurality of clamping arms extended from a rear side thereof for fastening to respective side arms at said motherboard at two sides relative to said insertion slots to secure said fan bracket to said motherboard, a plurality of protruding blocks respectively spaced above said clamping arms, and a plurality of eye lugs disposed above said protruding blocks; and an air duct connected to said fan bracket, said air duct comprising a bottom open side attached to said motherboard around said insertion slots, a plurality of first hooks respectively hooked on said protruding blocks of said fan bracket, and a plurality of second hooks respectively hooked on said eye lugs of said fan bracket.

2. The air director as claimed in claim 1, wherein said protruding blocks of said fan bracket are bilaterally protruded from an inside wall thereof.

3. The air director as claimed in claim 1, wherein said eye lugs are provided at a top side of said fan bracket.

4. The air director as claimed in claim 1, wherein said fan mounting structure comprises a plurality of locating blocks disposed a bottom side of said circular center opening for stopping against a front side of a bottom edge of said housing of said fan.

5. The air director as claimed in claim 1, wherein said fan mounting structure further comprises a springy hook protruded from the front side of said fan bracket above said circular center opening for hooking on a top edge of said housing of said fan.

6. The air director as claimed in claim 5, wherein fan mounting structure further comprises a plurality of locating rods spaced from said springy hook for engaging into respective locating holes on said housing of said fan.

7. The air director as claimed in claim 1, wherein said air duct further comprises a rear retaining flange transversely disposed at a rear side thereof for fastening to hook members at said motherboard at a rear side relative to said insertion slots.

* * * * *